United States Patent
Choi et al.

(10) Patent No.: US 11,439,899 B2
(45) Date of Patent: Sep. 13, 2022

(54) CONTROLLER CAPABLE OF CHANGING VOLUME BASED ON LINEAR MOTOR

(71) Applicant: KOREA UNIVERSITY OF TECHNOLOGY AND EDUCATION INDUSTRY-UNIVERSITY COOPERATION FOUNDATION, Cheonan-si (KR)

(72) Inventors: Dong Soo Choi, Cheonan-si (KR); Tae Hoon Kim, Seongnam-shi (KR); Sang Youn Kim, Seoul (KR)

(73) Assignee: KOREA UNIVERSITY OF TECHNOLOGY AND EDUCATION INDUSTRY-UNIVERSITY COOPERATION FOUNDATION, Cheonan-si (KR)

( * ) Notice: Subject to any disclaimer, the term of this patent is extended or adjusted under 35 U.S.C. 154(b) by 0 days.

(21) Appl. No.: 17/104,228

(22) Filed: Nov. 25, 2020

(65) Prior Publication Data

US 2021/0402289 A1   Dec. 30, 2021

(30) Foreign Application Priority Data

Jun. 30, 2020   (KR) .................. 10-2020-0080251

(51) Int. Cl.
*A63F 13/24* (2014.01)
*A63F 13/211* (2014.01)
*A63F 13/218* (2014.01)
*A63F 13/285* (2014.01)

(52) U.S. Cl.
CPC ............ *A63F 13/24* (2014.09); *A63F 13/211* (2014.09); *A63F 13/218* (2014.09); *A63F 13/285* (2014.09)

(58) Field of Classification Search
None
See application file for complete search history.

(56) References Cited

U.S. PATENT DOCUMENTS

| | | | |
|---|---|---|---|
| 6,924,787 B2 | 8/2005 | Kramer et al. | |
| 2003/0197682 A1* | 10/2003 | Huang | G06F 3/03543 345/163 |
| 2010/0283731 A1 | 11/2010 | Grant et al. | |

(Continued)

FOREIGN PATENT DOCUMENTS

| KR | 20-0336057 Y1 | 12/2003 |
|---|---|---|
| KR | 10-2011-0116892 A | 10/2011 |

OTHER PUBLICATIONS

Notice of Reasons for Refusal dated Dec. 9, 2021 from the Korean Patent Office in Korean Application No. 10-2020-0080251.

*Primary Examiner* — James S. McClellan
*Assistant Examiner* — Peter J Iannuzzi
(74) *Attorney, Agent, or Firm* — Sughrue Mion, PLLC

(57) ABSTRACT

Disclosed is a controller capable of changing volume. The controller according to the present invention includes a housing; a volume changing unit installed outside the housing and having one end and the other end movable with respect to the housing, respectively; a driving unit for moving at least one of one end and the other end of the volume changing unit; and a control unit for controlling the driving unit. According to the present invention, it is possible to improve a user's feeling of use and to enhance satisfaction and fun by variously changing the volume, shape, etc. of a controller.

8 Claims, 18 Drawing Sheets

(56) References Cited

U.S. PATENT DOCUMENTS

| | | | |
|---|---|---|---|
| 2011/0121953 A1* | 5/2011 | Grant | A63F 13/285 |
| | | | 340/407.1 |
| 2013/0029763 A1* | 1/2013 | Zhou | A63F 13/213 |
| | | | 463/37 |
| 2016/0107082 A1* | 4/2016 | Song | A63F 13/98 |
| | | | 463/37 |
| 2020/0159319 A1* | 5/2020 | Lin | A63F 13/24 |
| 2020/0222798 A1* | 7/2020 | Donahue | A63F 13/235 |

* cited by examiner

[FIG.1]
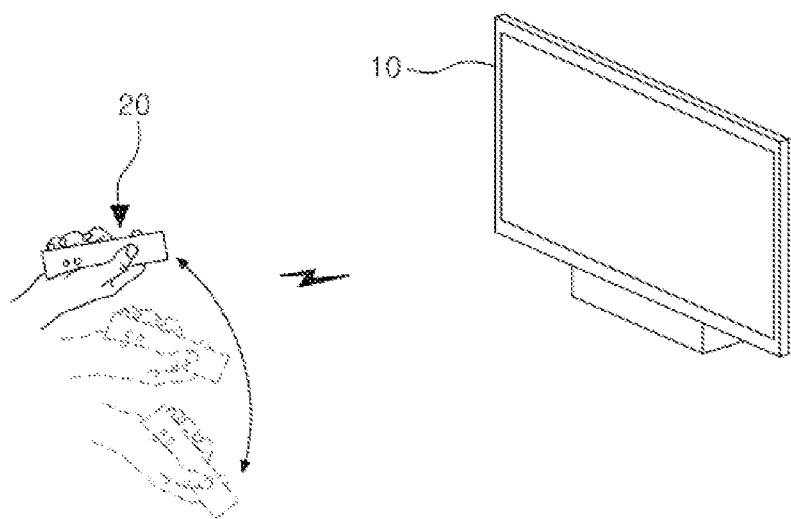
[FIG.2]
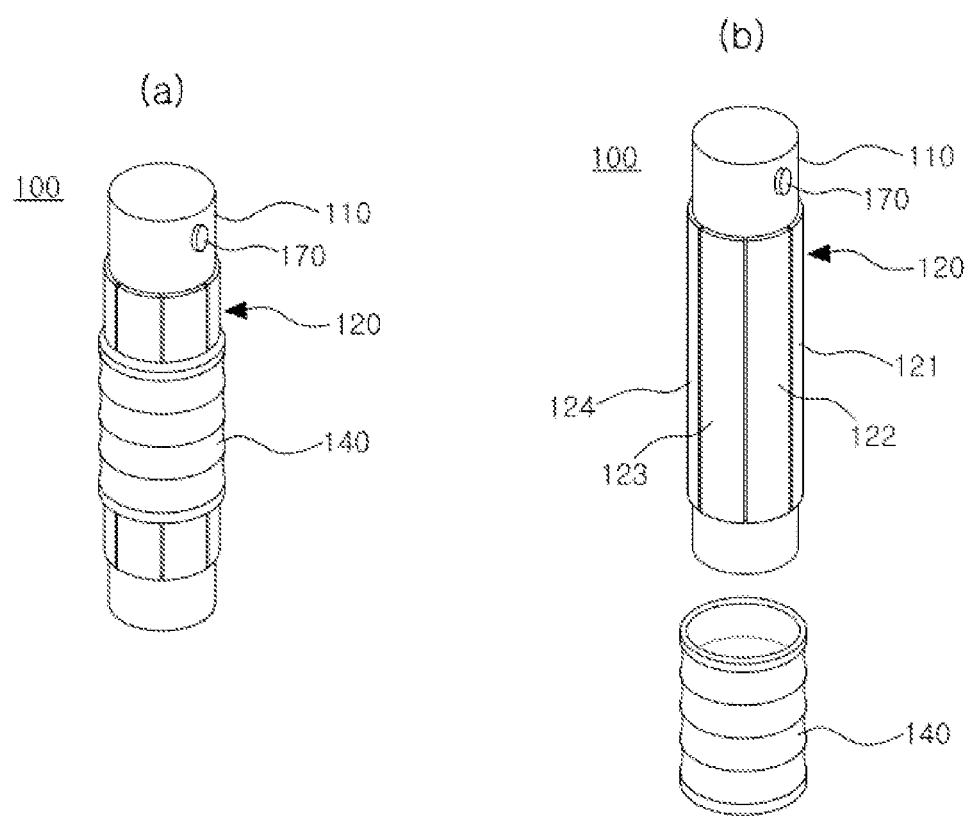

[FIG.3]
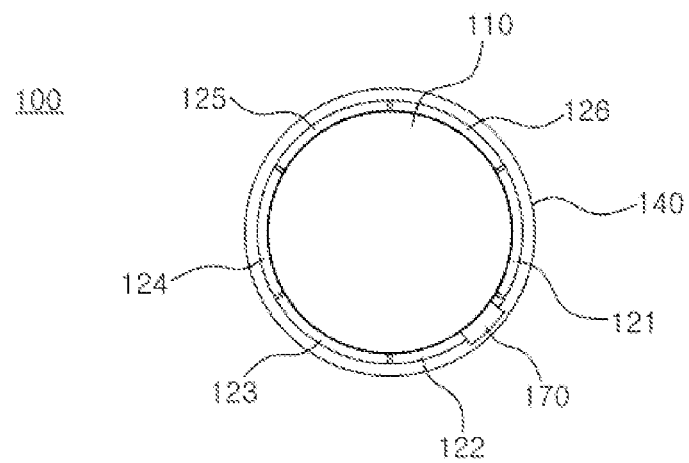
[FIG.4]
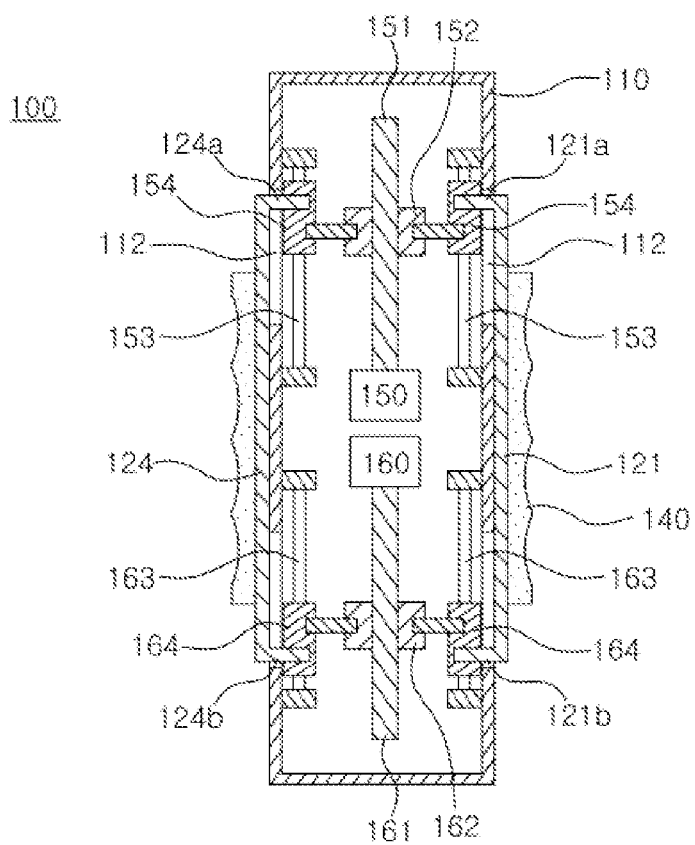

[FIG.5]
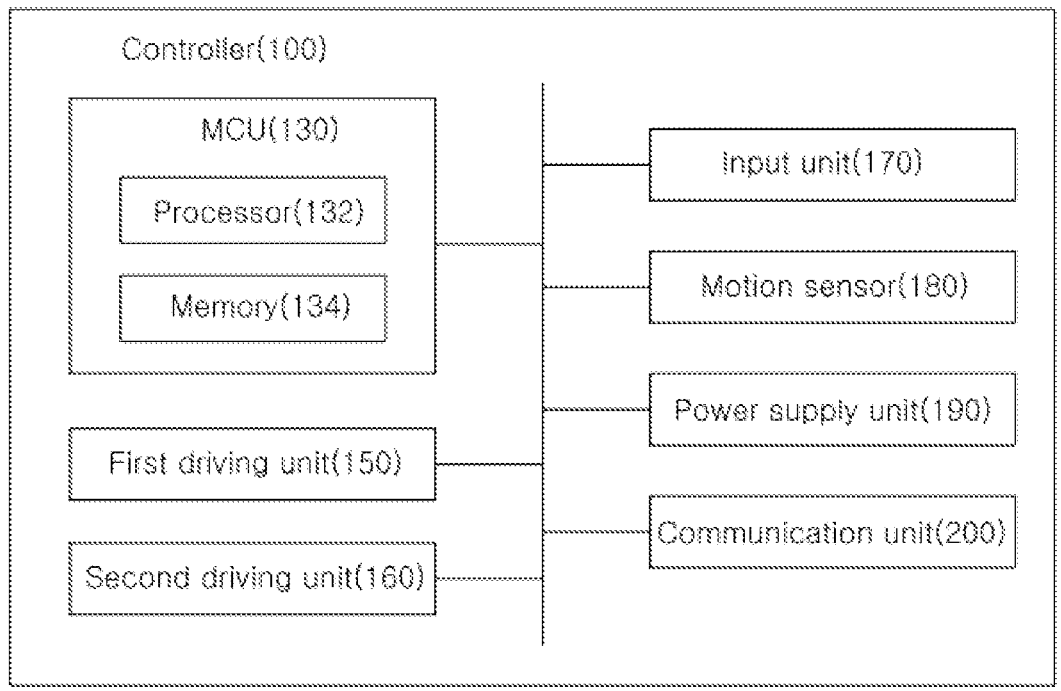

[FIG.6]
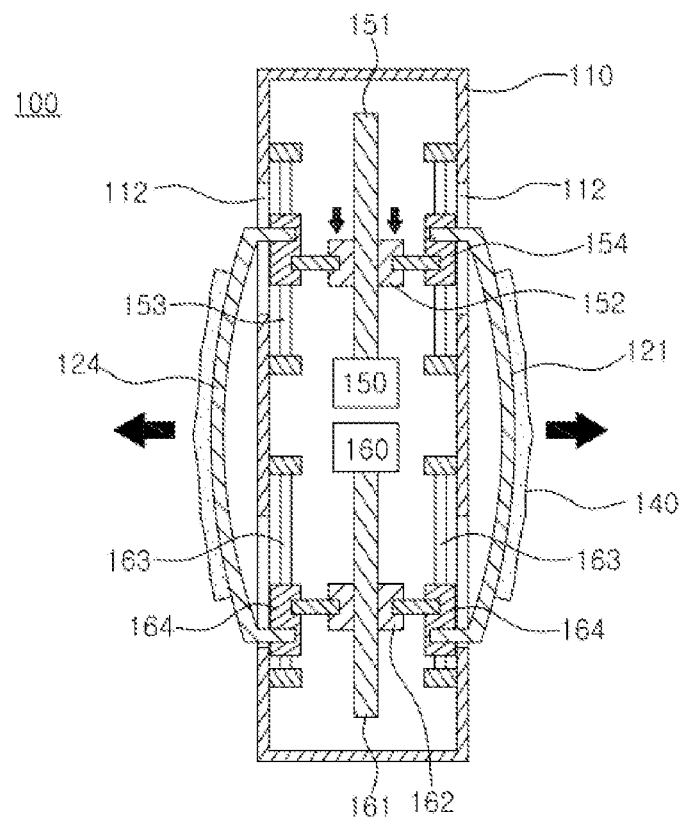
[FIG.7]
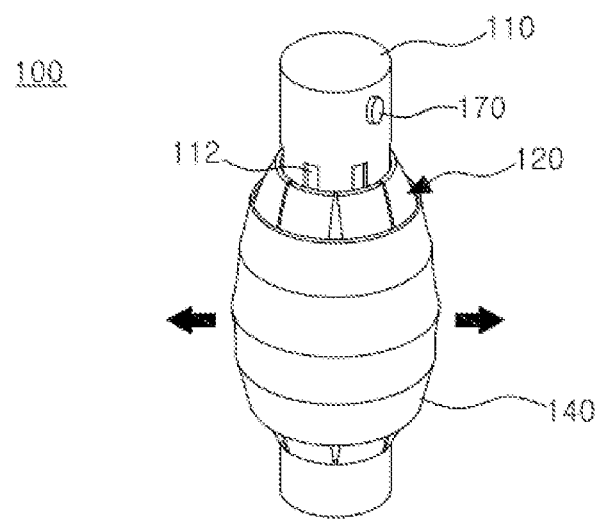

[FIG.8a]
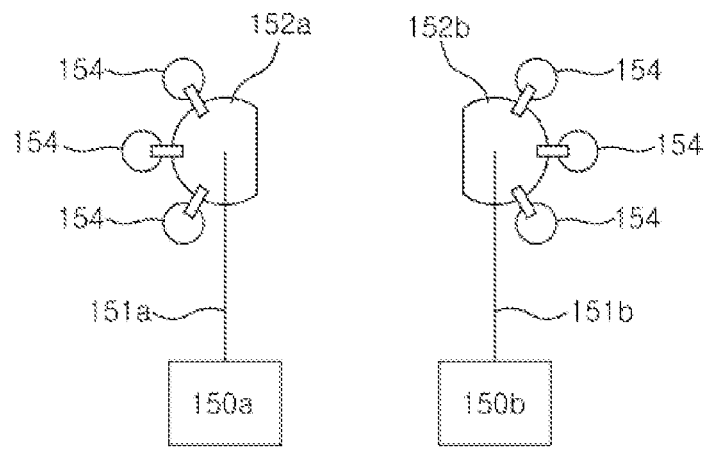
[FIG.8b]
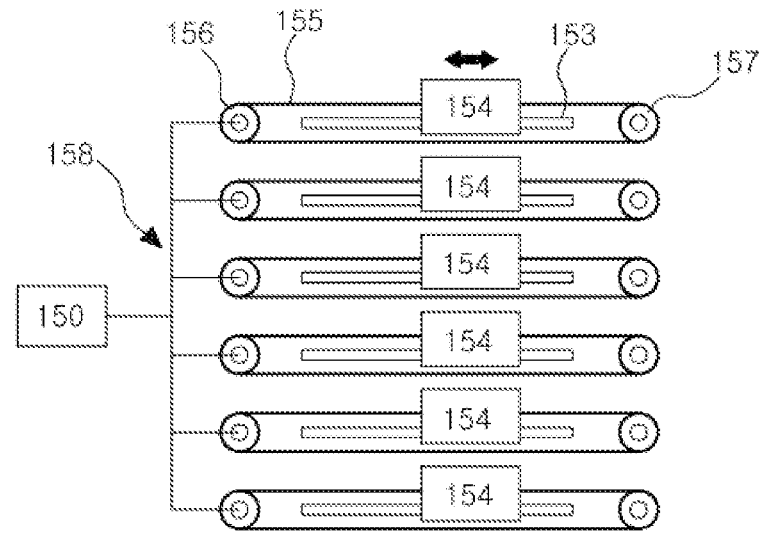

[FIG.8c]
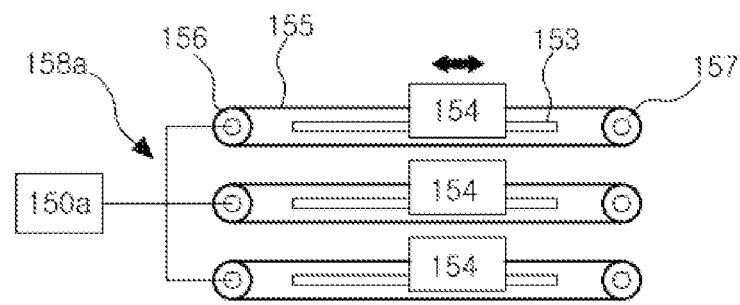
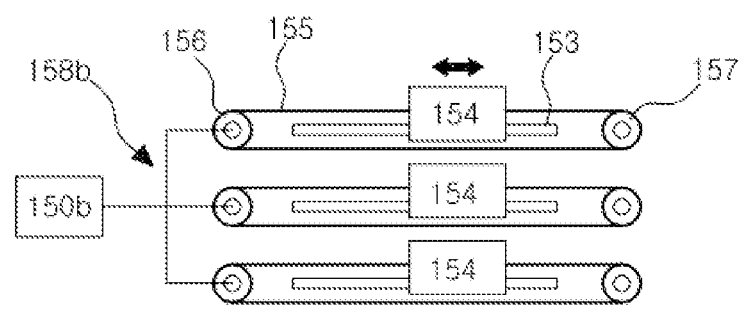

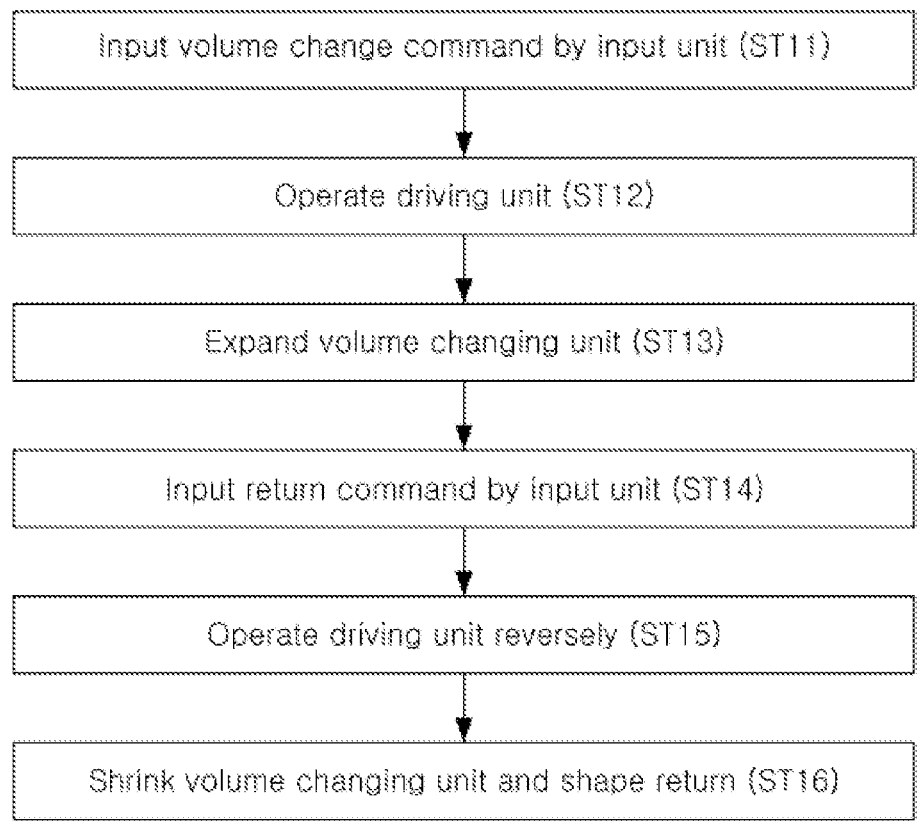
[FIG.9]

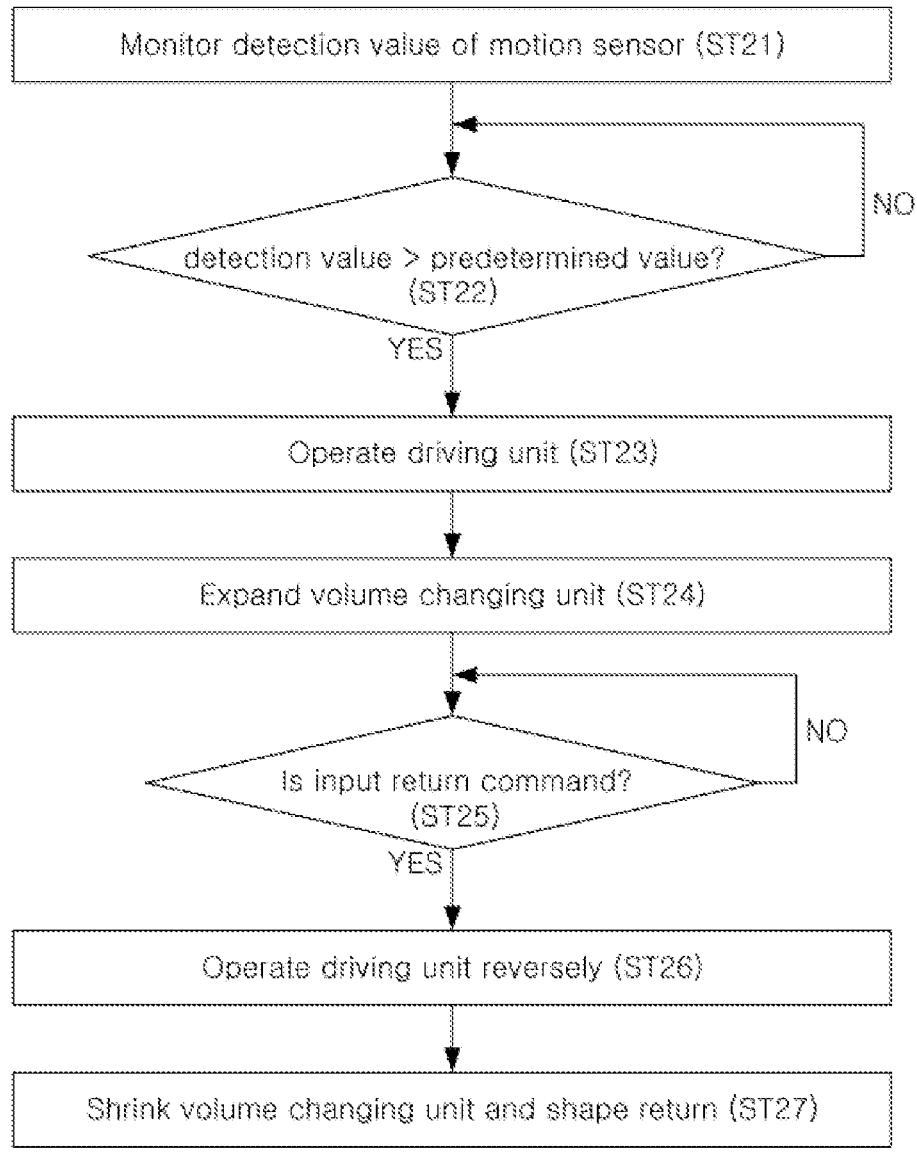

[FIG.11]
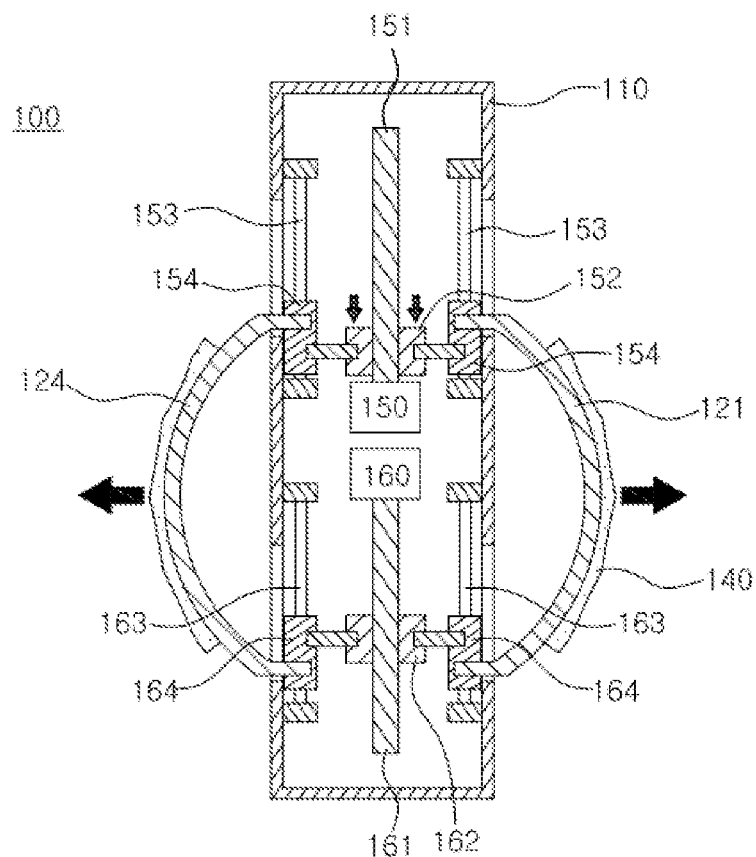
[FIG.12]
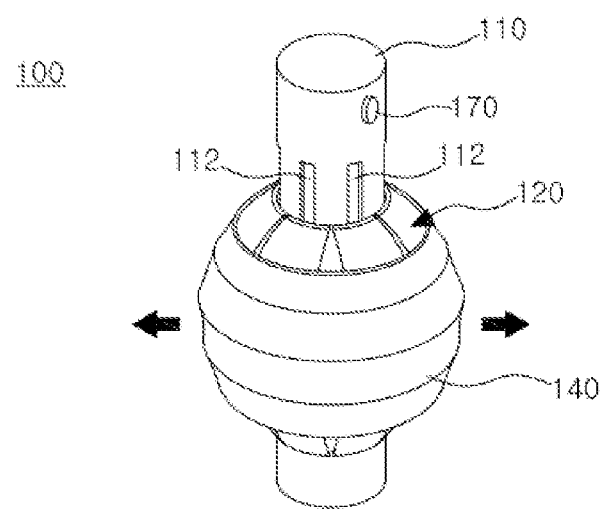

[FIG.13]
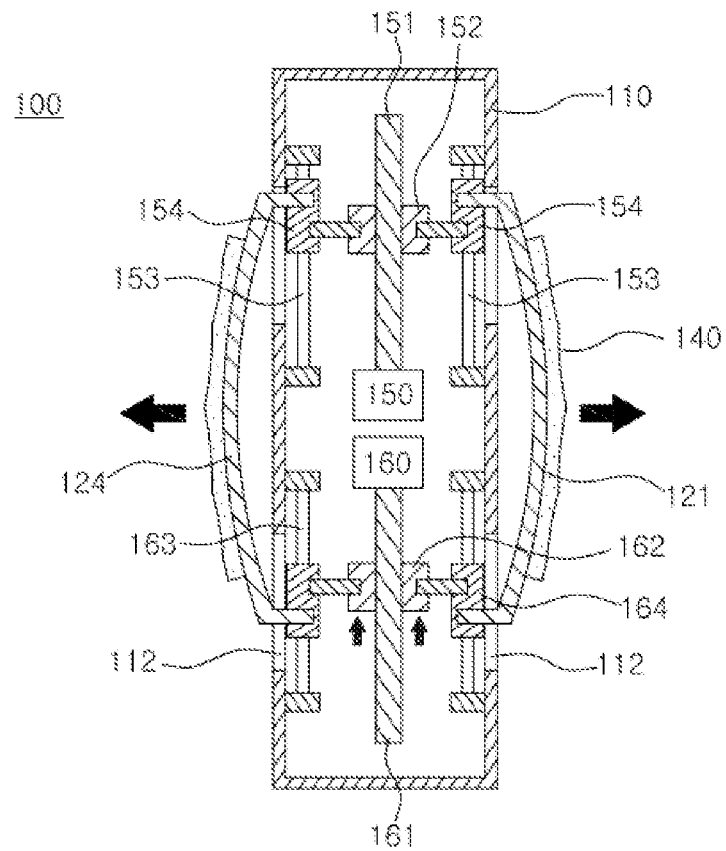
[FIG.14]
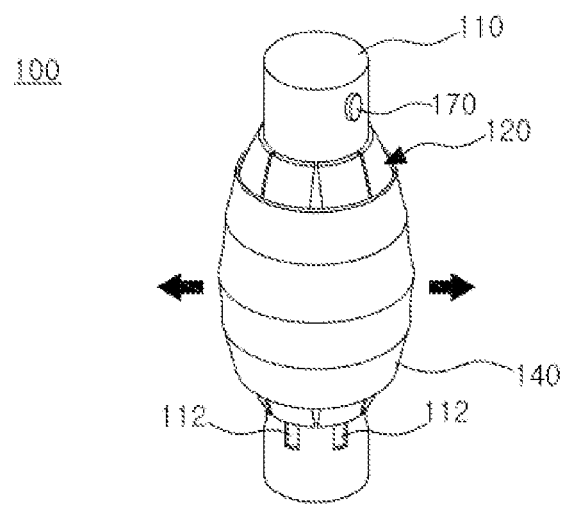

[FIG.15]
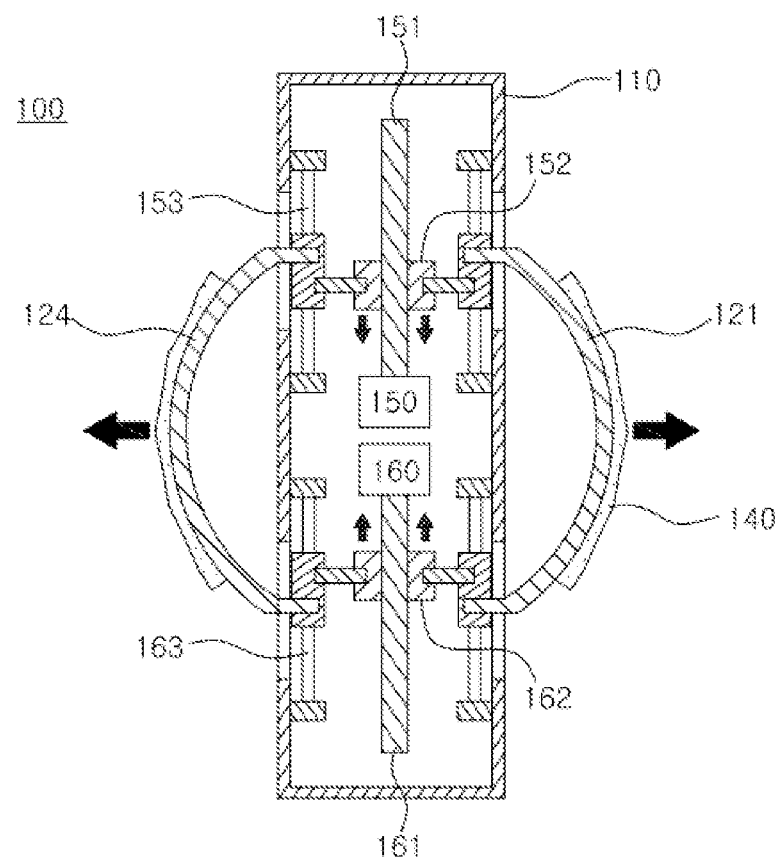

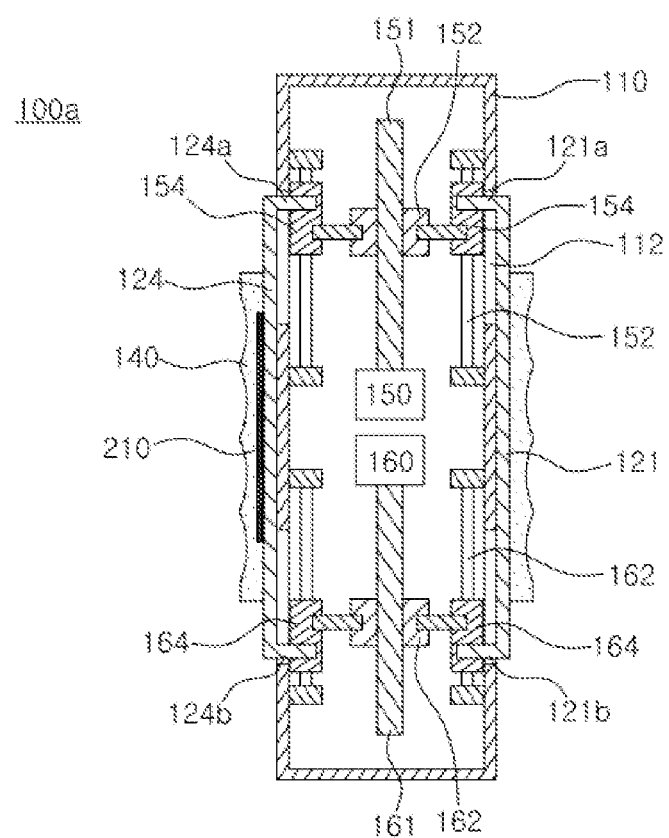
[FIG.16]

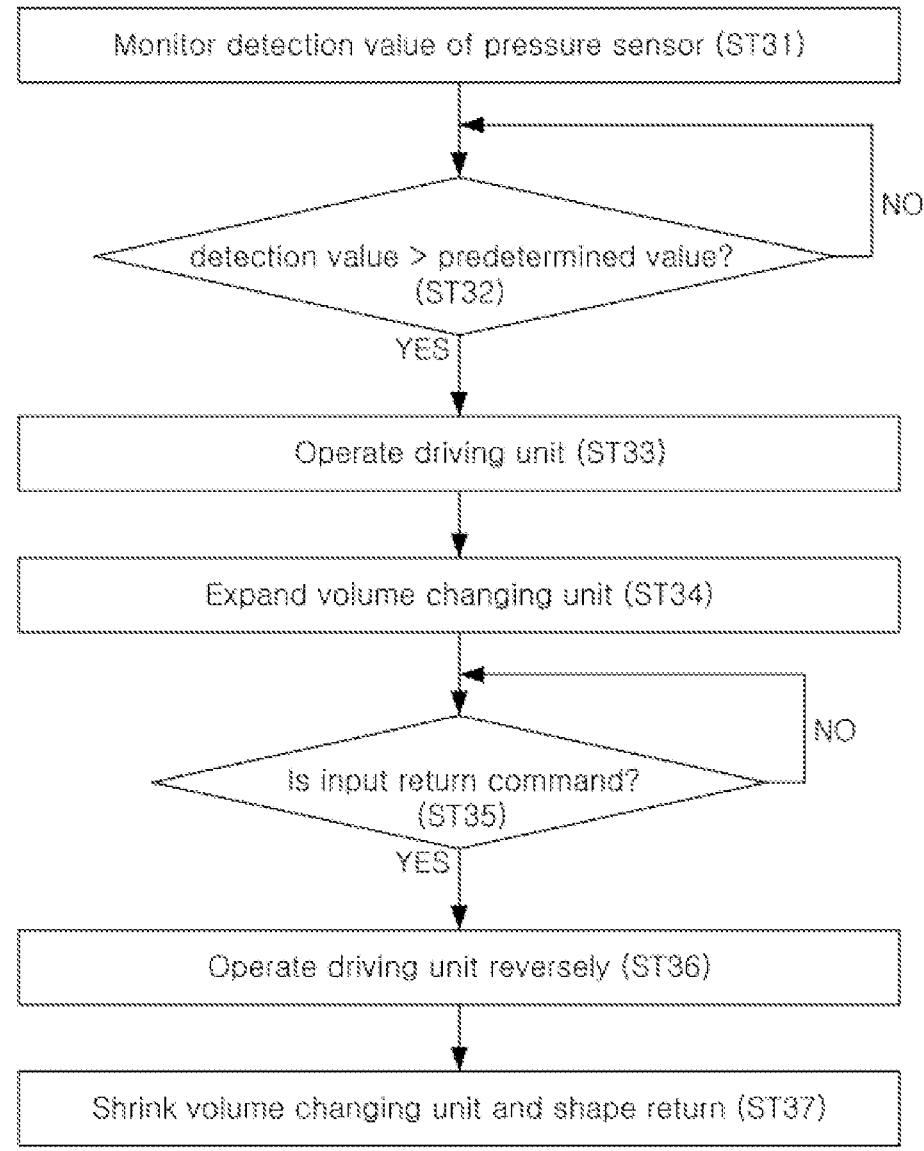

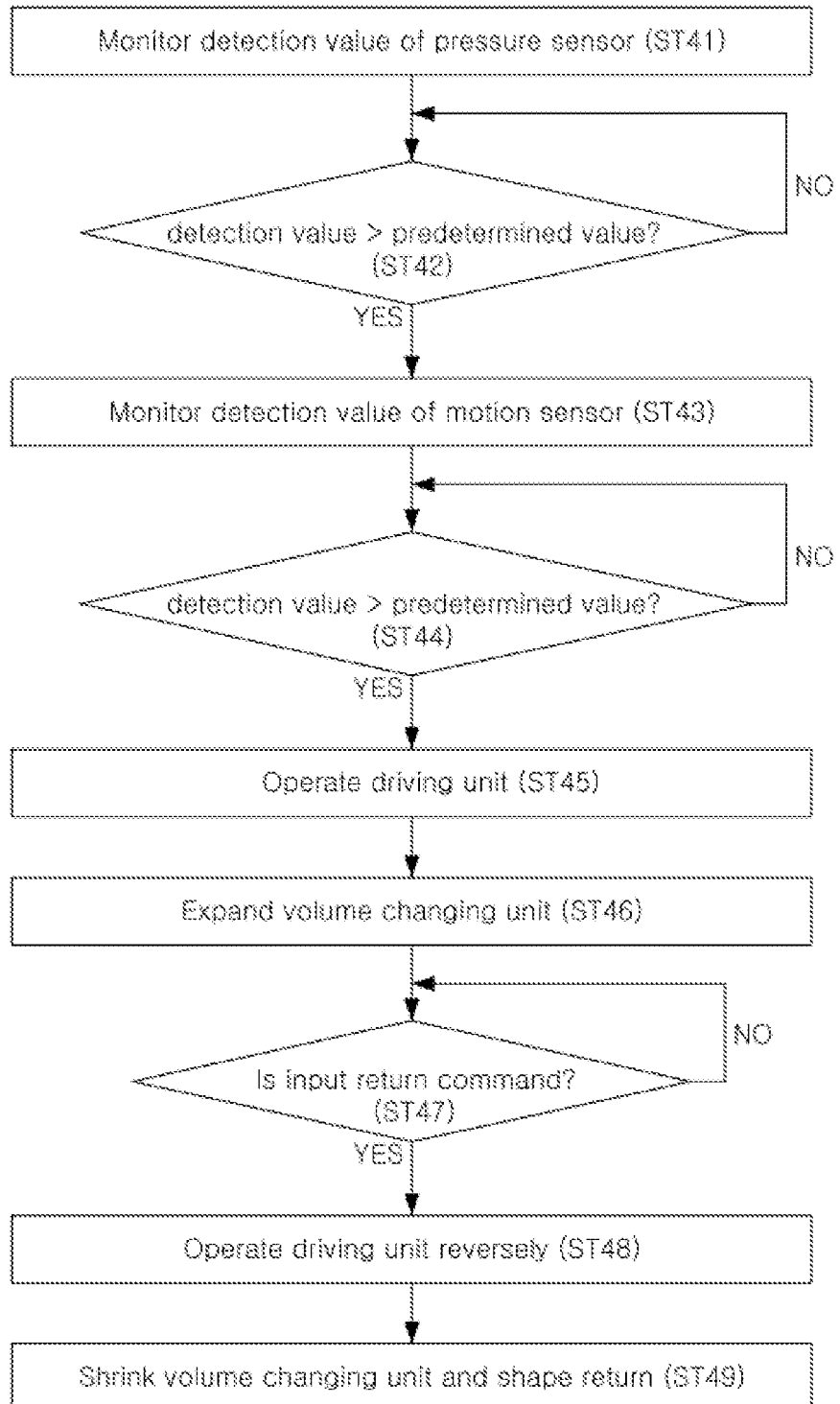
[FIG.18]

[FIG.19]
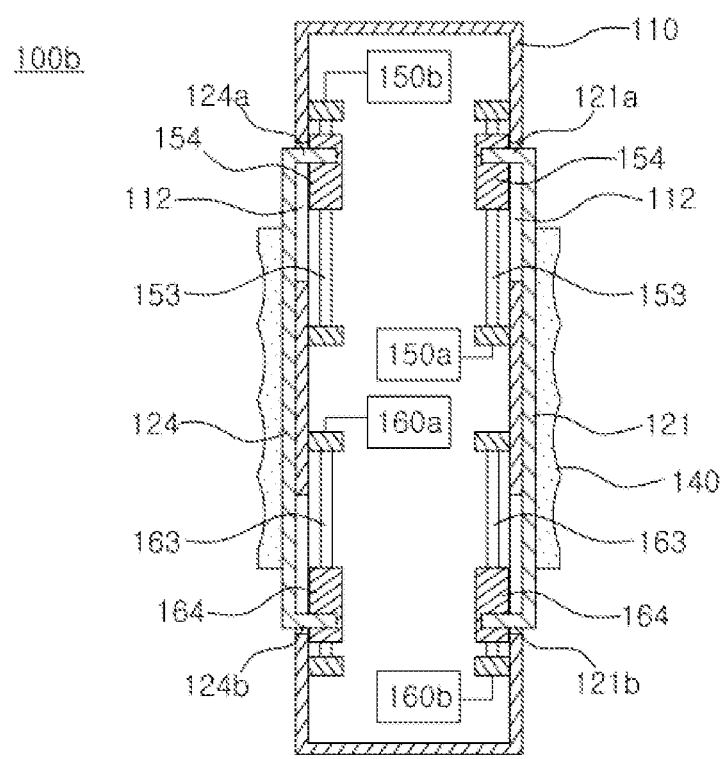

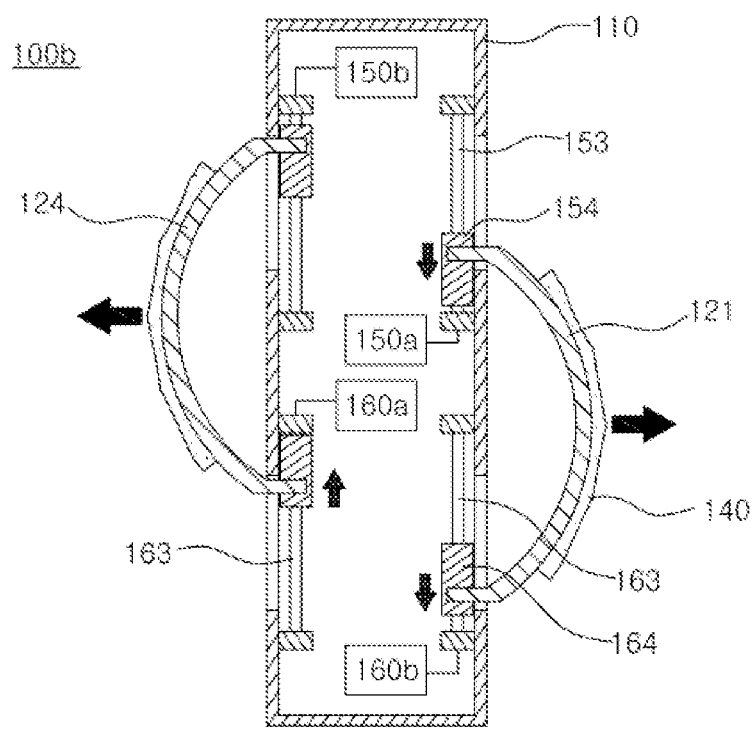
[FIG.20]

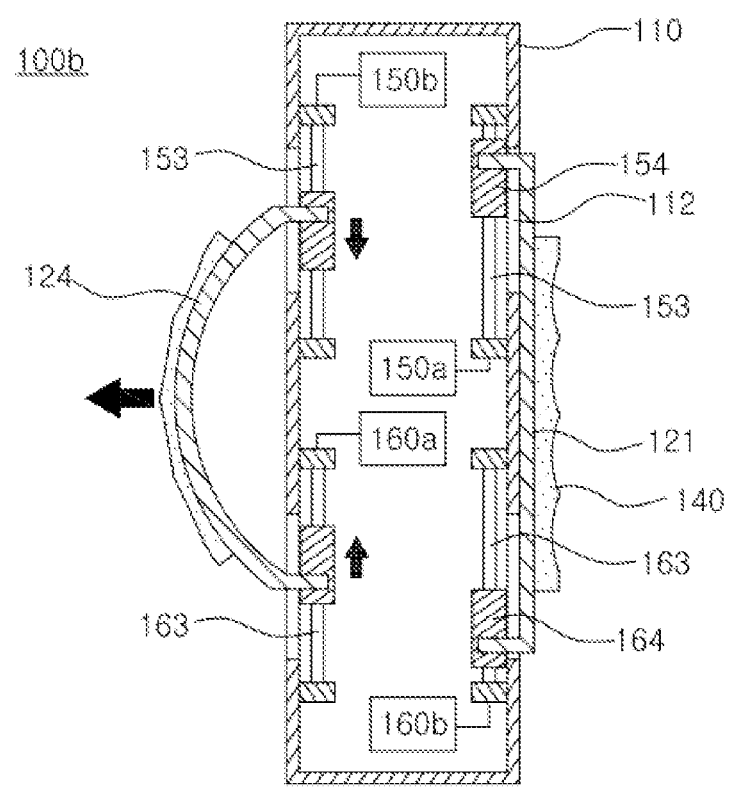
[FIG.21]

[FIG.22]
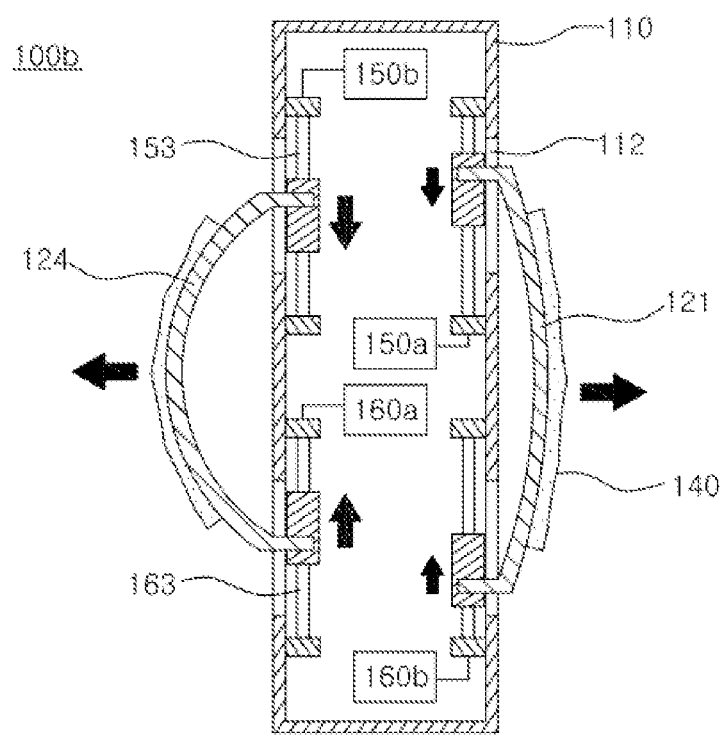
[FIG.23]
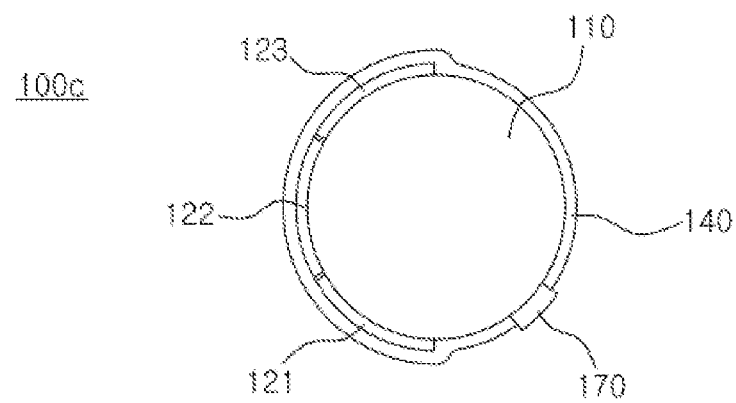

CONTROLLER CAPABLE OF CHANGING VOLUME BASED ON LINEAR MOTOR

CROSS-REFERENCE TO RELATED APPLICATIONS

This application claims the priority of Korean Patent Application No. 10-2020-0080251 filed on Jun. 30, 2020, in the Korean Intellectual Property Office, the disclosure of which is incorporated herein by reference.

BACKGROUND OF THE INVENTION

Field of the Invention

The present invention relates to a controller for controlling electronic devices, and more specifically, to a controller capable of providing a user with various feelings of use by changing the volume and shape of the controller.

Description of the Related Art

Recently, a handheld type controller has been widely used for controlling the operation of devices or controlling objects displayed on a display in electronic devices such as game consoles and VR devices.

FIG. 1 illustrates an example of use of a general handheld type controller 20, and when a user moves the controller 20 while holding the controller 20 in his hand, an electronic device 10 generates a predetermined control signal from a sensor measurement value received from the controller 20 to control the operation of the electronic device 10 or control the position, direction, and speed of an object displayed on the display.

Since the handheld type controller 20 is used by the user while held in his or her hand, it is preferred to have a shape, a grip feeling, and the like corresponding to a content executed in the electronic device.

However, in the conventional handheld type controller 20, since the shape thereof is fixed and the types of contents executed in the electronic device are very diverse, it is very difficult to provide a controller that allows the user to feel an optimum feeling of use for each content to be executed.

The above-described technical configuration is a background technique for assisting the understanding of the present invention, and does not mean a conventional technology widely known in the art to which the present invention belongs.

SUMMARY OF THE INVENTION

The present invention has been derived from the background, and an object of the present invention is to provide a user with various feelings of use and to enhance fun by changing the volume, shape, etc. of a controller as needed.

In order to achieve the objects, according to an aspect of the present invention, there is provided a controller including a housing; a volume changing unit installed outside the housing and having one end and the other end movable with respect to the housing, respectively; a driving unit for moving at least one of one end and the other end of the volume changing unit; and control unit for controlling the driving unit.

In the controller according to an aspect of the present invention, the volume changing unit may include a plurality of flexible plates. The plurality of flexible plates may be symmetrically arranged on the circumference of the housing.

Further, in the controller according to an aspect of the present invention, a plurality of moving blocks linearly moving by the driving unit may be installed inside the housing, and the volume changing unit may include at least one flexible plate having one end and the other end coupled to different moving blocks, respectively. At this time, the driving unit may include a first driving unit and a second driving unit, and one end of the flexible plate may be coupled to a first moving block for reciprocating linear motion by the first driving unit, and the other end of the flexible plate may be coupled to a second moving block for reciprocating linear motion by the second driving unit.

Further, in the controller according to an aspect of the present invention, the volume changing unit may include a plurality of flexible plates, the driving unit may include a plurality of upper driving units connected to upper ends of the plurality of flexible plates, respectively, and a plurality of lower driving units connected to lower ends of the plurality of flexible plates, respectively, and the control unit may individually control the shapes and positions of the plurality of flexible plates by independently controlling the plurality of upper driving units and the plurality of lower driving units.

Further, the controller according to an aspect of the present invention may include a motion sensor that detects the movement of the controller, wherein the control unit may control the driving unit to operate the volume changing unit only when a detection value of the motion sensor satisfies a predetermined condition. At this time, a pressure sensor may be installed on the housing, and the control unit may switch a mode of the controller from a standby mode to a motion monitoring mode when the detection value of the pressure sensor is greater than the predetermined value, and determine whether the detection value of the motion sensor satisfies the predetermined condition only after switching the mode to the motion monitoring mode.

Further, the controller according to an aspect of the present invention may further include a pressure sensor installed on the housing, wherein the control unit may control the driving unit to operate the volume changing unit only when a detection value of the pressure sensor satisfies a predetermined condition. At this time, a plurality of moving blocks linearly moving by the driving unit may be installed inside the housing, the volume changing unit may include at least one flexible plate having one end and the other end coupled to different moving blocks, respectively, and the control unit may adjust a gap between the two moving blocks, on which one end and the other end of the flexible plate are coupled, to a first distance when the detection value of the pressure sensor is within a first predetermined value, and adjust the gap between the two moving blocks to a second distance different from the first distance when the detection value is greater than the first predetermined value.

According to the present invention, it is possible to improve a user's feeling of use and to enhance satisfaction and fun by variously changing the volume, shape, etc. of a controller.

BRIEF DESCRIPTION OF THE DRAWINGS

The above and other aspects, features and other advantages of the present invention will be more clearly understood from the following detailed description taken in conjunction with the accompanying drawings, in which:

FIG. 1 is a view illustrating an example of using a conventional wireless controller;

FIG. 2 is a perspective view of a controller according to a first embodiment of the present invention;

FIG. 3 is a plan view of the controller according to the first embodiment of the present invention;

FIG. 4 is a cross-sectional view of the controller according to the first embodiment of the present invention;

FIG. 5 is a block view illustrating a control system of the controller according to the first embodiment of the present invention;

FIGS. 6 and 7 area cross-sectional view and a perspective view, respectively, illustrating a state in which each plate of controller is changed;

FIGS. 8A to 8C are views illustrating various power transmission methods, respectively;

FIG. 9 is a flowchart illustrating an operating method of the controller according to the first embodiment of the present invention;

FIG. 10 is a flowchart illustrating another operating method of the controller according to the first embodiment of the present invention;

FIGS. 11 to 15 are views illustrating various operations of the controller according to the first embodiment of the present invention, respectively;

FIG. 16 is a cross-sectional view of a controller according to a second embodiment of the present invention;

FIG. 17 is a flowchart illustrating an operating method of the controller according to the second embodiment of the present invention;

FIG. 18 is a flowchart illustrating another operating method of the controller according to the second embodiment of the present invention;

FIG. 19 is a cross-sectional view of a controller according to a third embodiment of the present invention.

FIGS. 20 to 22 are views illustrating various operations of the controller according to the third embodiment of the present invention, respectively; and FIG. 23 is a plan view of a controller according to a fourth embodiment of the present invention.

DETAILED DESCRIPTION OF THE PREFERRED EMBODIMENT

Hereinafter, preferred embodiments of the present invention will be described with reference to the drawings.

For reference, in the accompanying drawings of this specification, there are parts indicated with actually different dimensions or ratios, but this is for convenience of description and understanding, and thus, it should be noted in advance that the scope of the present invention should not be limitedly interpreted. Further, in this specification, when an element is connected, coupled, or electrically connected to another element, the element is not only directly connected, coupled, or electrically connected to another element, but also indirectly connected, coupled, or electrically connected to another element with other elements interposed therebetween. Also, when an element is directly connected or coupled to another element, it is meant that the element is connected or coupled to another element without other elements therebetween. In addition, when a certain part includes a certain element, unless otherwise indicated, it means that other elements may be further included rather than excluding other element. In addition, in this specification, since expressions such as front, rear, left, right, upper, and lower are relative concepts that may vary depending on viewing positions, the scope of the present invention is not necessarily limited to the corresponding expressions.

First Embodiment

FIGS. 2, 3, and 4 are a perspective view, a plan view, and a cross-sectional view of a controller 100 according to a first embodiment of the present invention, and FIG. 5 is a block view illustrating a control system of the controller 100.

As illustrated in the drawings, the controller 100 according to the first embodiment of the present invention includes a housing 110 having a space therein, a volume changing unit 120 installed outside the housing 110, and a handle unit 140 installed to surround the outside of the volume changing unit 120, and a first driving unit 150 and a second driving unit 160 for providing a driving force to the volume changing unit 120.

Further, the controller 100 according to the first embodiment of the present invention includes a power transmission means that transmits the power of the driving units 150 and 160 to the volume changing unit 120.

The power transmission means may include a first power transmission unit for transmitting the power of the first driving unit 150 and a second power transmission unit for transmitting the power of the second driving unit 160.

The first power transmission unit may include, for example, a first ball screw 151 rotated by the first driving unit 150, a first nut block 152 coupled to the first ball screw 151, a plurality of first moving guides 153 installed along a longitudinal direction of the housing in the housing 110, and a plurality of moving blocks 154 of which each one side is coupled to the first nut block 152 and the other side is coupled to the first moving guide 153.

In addition, the second power transmission unit may include, for example, a second ball screw 161 rotated by the second driving unit 160, a second nut block 162 coupled to the second ball screw 161, a plurality of second moving guides 163 installed along a longitudinal direction of the housing in the housing 110, and a plurality of moving blocks 164 of which each one side is coupled to the second nut block 162 and the other side is coupled to the second moving guide 163.

In the first embodiment of the present invention, the first power transmission unit connected to the first driving unit 150 is installed in the upper portion inside the housing 110, and the second power transmission unit connected to the second driving unit 160 is installed in the lower portion inside the housing 110. In this case, the first ball screw 151 and the second ball screw 161 may be arranged in a row along the longitudinal direction in the center of the housing 110. However, since the present invention is not necessarily limited thereto, the specific installation structure and position of the power transmission unit may be modified as much as possible according to the size, shape, etc. of the housing 110.

Meanwhile, in the first embodiment of the present invention, the upper end of the volume changing unit 120 is coupled to the moving block 154 connected to the first nut block 152, and the lower end of the volume changing unit 120 is coupled to the moving block 164 connected to the second nut block 162.

In this way, since both the upper and lower ends of the volume changing unit 120 are movable with respect to the housing, there is an advantage that the position as well as the shape of the volume changing unit 120 may be variously changed.

In addition, the controller 100 according to the first embodiment of the present invention may include a microcontroller unit (MCU) 150 for controlling the overall operation of the controller 100, an input unit 170 for inputting user's operation commands, a motion sensor 180 for detecting a user's motion, a communication unit 200 for communicating with external electronic devices, and a power supply unit 190 for supplying power to the MCU 130, the driving unit 160, the communication unit 200, etc.

Hereinafter, the elements of the controller 100 according to the first embodiment of the present invention will be described in more detail.

First, the volume changing unit 120 may include first to sixth plates 121, 122, 123, 124, 125, and 126 having long strip shapes along the longitudinal direction of the housing 110. However, since the number of plates is not limited thereto, only one plate may be installed or a larger number of plates may also be installed.

Upper ends (see 121a and 124a in FIG. 4) of the first to sixth plates 121, 122, 123, 124, 125, and 126 are coupled to the corresponding moving blocks 154 that ascend and descend by the first driving unit 150 in the housing 110, respectively. Lower ends (see 121b and 124b of FIG. 4) thereof may be coupled to the corresponding moving blocks 164 that ascend and descend by the second driving unit 160 in the housing 110, respectively.

In order to couple the first to sixth plates 121, 122, 123, 124, 125, and 126 installed outside the housing 110 to the internal moving blocks 154 and 164, a plurality of slits 112 having predetermined widths may be formed on the side of the housing 110 along the longitudinal direction.

Each of the plates 121, 122, 123, 124, 125, and 126 may be coupled to the internal moving blocks 154 and 164 after passing through each slit 112 by bending the upper and lower ends thereof, respectively. Unlike this, a coupling member such as a bolt may be used to couple the upper and lower ends of each plate to the corresponding moving blocks 154 and 164 by passing through the slit 112.

When connected in this manner, while the moving block 154 connected to the first driving unit 150 is fixed, only the moving block 164 connected to the second driving unit 160 may be moved. On the contrary, while the moving block 164 connected to the second driving unit 160 is fixed, only the moving block 154 connected to the first driving unit 150 may also be moved and both the upper and lower moving blocks 154 and 164 may be moved.

In addition, when a compressive force is applied to the upper end and/or lower end of each of the plates 121, 122, 123, 124, 125, and 126 when the moving blocks 154 and 164 are moved, as illustrated in a cross-sectional view of FIG. 6 and a perspective view of FIG. 7, while each plate is bent, a deformation occurs in which a middle part thereof expands outward.

As such, when the plate is bent outward, the user may feel a significant force feeling as well as a change in volume by the handle unit 140, and as a result, the user may feel more vivid and diverse feelings of use.

It goes without saying that in order for the first to sixth plates 121, 122, 123, 124, 125, and 126 to be changed as such, a flexible material such as metal, synthetic resin, rubber, and silicone needs to be used.

The handle unit 140 surrounds the outside of the volume changing unit 120, and since the handle unit 140 is stretched together when the plate is bent, and needs to return to its original shape when the plate is unfolded, the handle unit 140 needs to be formed of a flexible material. In addition, it is preferred to have a material and a shape in which the user may feel an optimum grip feeling.

The handle unit 140 preferably has a cylindrical shape as illustrated in FIG. 2B, but is not necessarily limited thereto. For example, each of the plates 121, 122, 123, 124, 125, and 126 may be formed by attaching a material such as silicone having a good grip feeling on the surface to form the handle unit 140, and when the plate itself is made of a material having a good grip feeling, the handle unit 140 may also be omitted.

A pressure sensor (see 210 of FIG. 16) for sensing pressure applied by the user may be installed inside the handle unit 140. The use of the pressure sensor 120 will be described below.

The first and second driving units 150 and 160 may be rotation driving means such as motors, rotation cylinders, or the like that rotate the ball screws 151 and 161, respectively. However, since the present invention is not limited thereto, when the ball screws 151 and 161 are not used, a linear driving means such as a pneumatic cylinder may also be used.

In addition, in the first embodiment of the present invention, the ball screws 151 and 161, the nut blocks 152 and 162, and the like have been used to convert the rotational force of the driving units 150 and 160 into linear motion of the moving blocks 154 and 164, but the power transmission means is not limited thereto. Accordingly, the linear reciprocating motion of the moving blocks 154 and 164 may be implemented by appropriately selecting or combining known components such as gears, pulleys, wires, belts, and chains.

In addition, in FIGS. 4 and 6, it is illustrated that the two driving units 150 and 160 elevate the six moving blocks 154 and 164 at the same time, respectively, but are not necessarily limited thereto.

For example, as illustrated in FIG. 8A, the first driving unit 150 and the power transmission unit connected thereto may be divided into two parts, respectively. That is, three moving blocks 154 are coupled to a 1-1 nut block 152a coupled to a 1-1 ball screw 151a rotating by a 1-1 driving unit 150a, and the rest of three moving blocks 154 may be coupled to a 1-2 nut block 152b coupled to a 1-2 ball screw 151b rotating by a 1-2 driving unit 150b.

Unlike this, the first driving unit 150 and the power transmission unit connected thereto may be divided into three parts, and each power transmission unit may be configured to move two moving blocks 154. The first driving unit 150 and the power transmission unit connected thereto may be divided into six parts, and each power transmission unit may be configured to move one moving block 154.

It goes without saying that the second driving unit 160 and the power transmission unit connected thereto may also be configured in various manners, like the first driving unit 150.

As such, if the first driving unit 150 and the second driving unit 160 are divided into multiples parts, it is possible to individually change or move the first to sixth plates 121, 122, 123, 124, 125, and 126, and as a result, the shape of the controller 100 may be changed in more various ways.

In addition, at least one of the length, width, thickness, and material of each plate is different from those of other plates, thereby changing the shape of the controller 100 in more various ways.

Meanwhile, in FIGS. 4 and 6, it is illustrated that the moving blocks 154 and 164 are moved by the ball screws 151 and 161 and the nut blocks 152 and 162, but the linear motion means of the moving blocks 154 and 164 is not limited thereto.

For example, as illustrated in FIG. 8B, the six moving blocks 154 coupled to the moving guide 153 are coupled to a wire 155 wound around a driving pulley 156 and a driven pulley 157, respectively, and each driving pulley 156 is rotated using the first driving unit 150, so that each moving block 154 may be linearly moved along the moving guide 153.

At this time, the power transmission unit 158 that converts the driving force of the first driving unit 150 into a rotational motion of the driving pulley 156 may be configured by selectively combining gears, pulleys, wires, belts, chains, and the like.

In FIG. 8B, it is illustrated that all the moving blocks 154 are simultaneously moved by one driving unit 150, but the present invention is not necessarily limited thereto.

For example, as illustrated in FIG. 8C, instead of the first driving unit 150, the 1-1 driving unit 150a and the 1-2 driving unit 150b are installed, and the 1-1 driving unit 150a may be configured to move the three moving blocks 154 through the first power transmission unit 158a, and the 1-2 driving unit 150b may also be configured to move the remaining three moving blocks 154 through the second power transmission unit 158b.

FIG. 8C illustrates a case in which three moving blocks are moved by one driving unit, but is not limited thereto. For example, three driving units may be installed and each driving unit may be configured to move two moving blocks, or six driving units may be installed and each driving unit may be configured to move one moving block. In addition, one driving unit may be configured to move two moving blocks, another driving unit may be configured to move three moving blocks, and the other driving unit may be configured to move one moving block.

Even in this case, at least one of the length, width, thickness, and material of the plate connected to each driving unit may be different from those of the plate connected to the other driving unit, and as a result, the shape of the controller 100 may be more variously changed.

FIGS. 8B and 8C illustrate that the moving block 154 is coupled to the wire 155, but may be coupled to a belt, a chain, or the like.

The configurations of the first driving unit 150 and the power transmission unit illustrated in FIGS. 8A to 8C may be equally applied to the second driving unit 160 and the power transmission unit therefor.

Meanwhile, the input unit 170 of the controller 100 is preferably installed at a portion adjacent to the handle unit 140 so that the user may press or touch the input unit with a thumb or the like. In the drawing, the input unit 170 is illustrated as a single button, but this is only an example. For example, the input unit 170 may include a plurality of buttons, and may also include a joystick, or a touch pad or a touch screen.

The motion sensor 180 is to detect a direction, a speed, a posture, etc. of the controller 100, and may include at least one of an acceleration sensor and a 3-axis angular velocity sensor (gyro sensor).

The MCU 130 may control the driving unit 160 using an input through the input unit 170 or a measurement value of the motion sensor 180.

The power supply unit 190 may include a battery and a switching circuit that turns on/off power supply to the driving unit 160 according to the control of the MCU 130. The power supply unit 190 may include an AC-DC conversion circuit instead of the battery.

The communication unit 200 supports wired and/or wireless communication between the controller 100 and the electronic device. The wireless communication method is not particularly limited, and may be selected from known communication methods, such as Bluetooth, Zigbee, WiFi, infrared data communication (IrDA), and ultra-wide band (UWB).

The MCU 130 may include a processor 132 and a memory 134 as illustrated in the block view of FIG. 5.

The processor 132 executes a computer program stored in the memory 134 to perform a predetermined operation. The processor 132 and the memory 134 may be packaged as a single chip.

The memory 134 may store computer programs, various parameters, data, etc. for the operation of the controller 100. The memory 134 may include a nonvolatile memory such as a flash memory and a volatile memory such as a RAM.

The computer program stored in the memory 134 may include a driving unit control program that controls the driving units 150 and 160 using detection values of the motion sensor 180 and/or the pressure sensor 210.

For example, when the user shakes the controller 100, the MCU 130 controls the power supply unit 190 to apply a predetermined voltage to the driving units 150 and 160 and move the moving block 164 when the detection value of the motion sensor 180 is greater than a predetermined value, thereby changing the volume and shape of the controller 100.

Hereinafter, an operating method of the controller 100 according to the first embodiment of the present invention will be described in more detail.

First, a case where the user presses a button provided on the input unit 170 or selects a menu to input an expansion command will be described with reference to FIG. 9.

When the user who wants to change the shape of the controller 100 inputs an expansion command through the input unit 170, the MCU 130 controls the power supply unit 190 to apply a voltage to the first driving unit 150 and/or the second driving unit 160 (ST11).

At this time, if only the first driving unit 150 is operated, as illustrated in FIG. 6, as the first nut block 152 descends along the first ball screw 151, the moving block 154 connected to the first nut block 152 descends.

In addition, if only the second driving unit 160 is operated, as illustrated in FIG. 13, as the second nut block 162 ascends along the second ball screw 161, the moving block 164 connected to the second nut block 162 ascends.

In addition, when both the first driving unit 150 and the second driving unit 160 are operated, as illustrated in FIG. 15, the moving block 154 connected to the first nut block 152 descends, and the moving block 164 connected to the second nut block 162 ascends (ST12).

As such, when the moving blocks 154 and 164 descend and/or ascend, the compressive force is applied to the upper end and/or the lower end of each of the plates 121, 122, 123, 124, 125, and 126 of the volume changing unit 120 connected to the moving blocks 154 and 164, and as a result, a deformation occurs in which the middle portion of each plate is bent outward.

At this time, the user who has held the handle unit 140 feels a considerable force feeling together with the volume change.

On the other hand, if only the first driving unit 150 is operated, as illustrated in FIG. 7, while the upper end of each of the plates 121, 122, 123, 124, 125, and 126 descends, the volume changing unit 120 expands outward.

At this time, if the upper end of each of the plates 121, 122, 123, 124, 125, and 126 further descends compared to FIGS. 6 and 7, as illustrated in FIGS. 11 and 12, each plate is bent to a greater width so that the volume changing unit 120 expands outward to a greater width.

In addition, if only the second driving unit 160 is operated, as illustrated in FIG. 14, while the lower end of each of the plates 121, 122, 123, 124, 125, and 126 ascends, the volume changing unit 120 expands outward.

In addition, when both the first driving unit 150 and the second driving unit 160 are operated, as illustrated in FIG. 15, the upper end of each of the plates 121, 122, 123, 124, 125, and 126 descends and the lower end thereof ascends. Accordingly, as each plate is bent to a large width, the volume changing unit 120 may expand to a larger width compared to FIGS. 7 and 13. (ST13).

After changes in volume and shape of the controller 100 occur in the above manner, the user may press a button provided on the input unit 170 or select a menu to input a return command (ST14).

When the return command is input as described above, the MCU 130 controls the driving units 150 and 160 to rotate the ball screw 151 and 161 in an opposite direction to the previous direction. Due to this, the nut blocks 152 and 162 and the moving blocks 154 and 164 move to their original positions (ST15).

When each of the moving blocks 154 and 164 is moved to its original position, the upper end and/or the lower end of each plate of the volume changing unit 120 also returns to its original position, and each plate returns to its original shape to be almost in close contact with the surface of the housing 110. Accordingly, the volume changing unit 120 shrinks to its original volume.

At this time, the user feels that the volume of the handle unit 140 is decreased to the original volume (ST16).

Meanwhile, since the motion sensor 180 is installed in the controller 100 according to the first embodiment of the present invention, the expansion command may be generated by detecting the user's intention through the motion sensor 180. Hereinafter, this method will be described with reference to FIG. 10.

First, when the user shakes or swings the controller 100 while holding the controller in his hand, the MCU 130 may detect a detection value of the motion sensor 180 and compare the detection value with a predetermined value.

On the other hand, when the power of the controller 100 is turned on, the MCU 130 may always monitor the detection value of the motion sensor 180, or may monitor the detection value of the motion sensor 180 only after switching from a standby mode to a motion detection mode through a separate mode switching means. The mode switching means may be provided in the input unit 170 or may be provided in other forms (ST21 and ST22).

When the detection value of the motion sensor 180 is greater than the predetermined value, the MCU 130 controls the power supply 190 to apply a voltage to the first driving unit 150 and/or the second driving unit 160.

Accordingly, when the first driving unit 150 and/or the second driving unit 160 rotates the ball screws 151 and 161 in a predetermined direction, as illustrated in FIG. 6, the nut blocks 152 and 162 move along the ball screws 151 and 161, and as a result, the moving blocks 154 and 164 connected to the nut blocks 152 and 162 also move together (ST23).

As a result, a deformation occurs in which the middle portion of each plate 121, 122, 123, 124, 125, or 126 of the volume changing unit 120 is bent toward the outside (ST24).

After the shape of the controller 100 is changed through the above process, the shape of the controller 100 needs to return to its original shape again if desired by the user.

For this, the MCU 130 needs to be able to determine whether there is a shape return command. For example, when a predetermined command is input through the input unit 170, the MCU 130 may determine this command as a shape return command. In addition, when the pressure satisfying a predetermined condition is measured through the pressure sensor (210 of FIG. 16), the MCU 130 may determine the signal of the pressure sensor 210 as a shape return command. In addition, when the acceleration and/or angular velocity satisfying the predetermined condition is measured through the motion sensor 180, the MCU 130 may determine the signal of the motion sensor 180 as a shape return command (ST25).

When the shape return command is detected, the MCU 130 rotates the ball screws 151 and 161 in an opposite direction to the previous direction through the first driving unit 150 and/or the second driving unit 160. Due to this, the nut blocks 152 and 162 and the moving blocks 154 and 164 return to their original positions (ST26).

When the nut blocks 152 and 162 return to their original positions, each plate of the volume changing unit 120 also returns to its original shape and the volume changing unit 120 shrinks to its original volume (ST27).

Second Embodiment

A controller 100*a* according to a second embodiment of the present invention is different from that of the first embodiment in that a pressure sensor 210 is installed inside the handle unit 140, as illustrated in a cross-sectional view of FIG. 16, and the rest of the configuration is the same as the controller 100 of the first embodiment.

Therefore, hereinafter, only various operating methods of the controller 100*a* according to the second embodiment using the pressure sensor 210 will be described.

First, one of the operating method of the controller 100*a* will be described with reference to FIG. 17.

When the user applies pressure to the handle unit 140 while holding the handle unit 140 of the controller 100*a* in his/her hand, the MCU 130 monitors a detection value of the pressure sensor 210, and compares the detection value with a predetermined value (ST31, ST32).

When the detection value of the motion sensor 210 is greater than the predetermined value, the MCU 130 controls the power supply 190 to apply a voltage to the first driving unit 150 and/or the second driving unit 160.

Accordingly, when the first driving unit 150 and/or the second driving unit 160 operate to rotate the ball screws 151 and 161 in a predetermined direction, as illustrated in FIG. 6, the nut blocks 152 and 162 move along the ball screws 151 and 161, and as a result, the moving blocks 154 and 164 connected to the nut blocks 152 and 162 also move together.

At this time, depending on the magnitude of the detection value of the pressure sensor 210, an interval between the upper and lower moving blocks 154 and 164 may be adjusted by differentiating the voltage or operating time applied to the first driving unit 150 and/or the second driving unit 160.

For example, if the detection value of the pressure sensor 210 is within a first predetermined value, a gap between the upper and lower moving blocks 154 and 164 is adjusted to a first distance, and if the detection value is greater than the first predetermined value, a gap between the moving blocks 154 and 164 may be adjusted to a second distance smaller than the first distance.

In this way, as the pressure applied by the user increases, the gap between the upper and lower movement blocks 154 and 164 decreases, so that the plate is bent more and the volume changing unit 120 expands further outward.

On the contrary, if the detection value of the pressure sensor 210 is greater than the first predetermined value, the gap between the moving blocks 154 and 164 may be adjusted to a second distance greater than the first distance.

In this way, as the pressure applied by the user increases, the gap between the upper and lower moving blocks 154 and 164 increases, so that the plate is unfolded and the volume of the volume changing unit 120 decreases.

Regardless of which method is applied, according to the second embodiment of the present invention, there is an advantage that the shape of the controller 100*a* may be changed differently according to the size of the pressure (ST33).

When the moving blocks 154 and 164 are moved as such, the volume and shape of the controller are changed, as described above. The specific operation is as described in ST24 to ST27 of FIG. 10 (ST34 to ST37).

Next, another operating method of the controller 100*a* according to the second embodiment of the present invention will be described with reference to FIG. 18.

In this case, the method is a method of using the pressure sensor 210 as a mode switching means. That is, when the user applies pressure to the handle unit 140 while holding the handle unit 140 of the controller 100*a* in his/her hand, the MCU 130 compares a detection value of the pressure sensor 210 with a predetermined value (ST41, ST42).

When the detection value of the pressure sensor 210 is greater than the predetermined value, the MCU 130 switches the mode of the controller 100*a* from a standby mode to a motion monitoring mode, and detects the detection value of the motion sensor 180 (ST43).

When the detection value of the motion sensor 180 is greater than the predetermined value, the MCU 130 controls the power supply 190 to apply a voltage to the first driving unit 150 and/or the second driving unit 160, and as a result, the moving blocks 154 and 164 move (ST44, ST45).

When the moving blocks 154 and 164 are moved as such, the volume and shape of the controller are changed, as described above. The specific operation is as described in ST24 to ST27 of FIG. 10 (ST46 to ST49).

Third Embodiment

FIG. 19 is a cross-sectional view illustrating a controller 100*b* according to a third embodiment of the present invention. In the controller 100*b* according to the third embodiment of the present invention, a first driving unit 150 for moving the upper ends of first to sixth plates 121, 122, 123, 124, 125, and 126 includes a plurality of upper driving units 150*a* and 150*b*, and a second driving unit 160 for moving the lower ends thereof includes a plurality of lower driving units 160*a* and 160*b*.

In addition, the plurality of upper driving units 150*a* and 150*b* are installed to move one or more moving blocks 154 along the longitudinal direction of a housing 110 through a power transmission unit, respectively, and the plurality of lower driving units 160*a* and 160*b* are installed to move one or more moving blocks 164 along the longitudinal direction of the housing 110 through the power transmission unit, respectively.

Therefore, according to the third embodiment of the present invention, the upper and lower ends of the first to sixth plates 121, 122, 123, 124, 125, and 126 constituting the volume changing unit 120 may ascend and descend, respectively, and as a result, various shapes may be implemented.

As an example, as illustrated in FIG. 20, the plate 124 on one side of the volume changing unit 120 may be deformed while the upper end thereof is fixed and the lower end thereof ascends, and the plate 121 on the other side of the volume changing unit 120 may be deformed while the lower end thereof is fixed and the upper end thereof descends.

As another example, as illustrated in FIGS. 21 and 22, the upper and lower ends of the plate 124 on one side of the volume changing unit 120 are deformed to a large width by moving toward each other, and the plate 121 on the other side of the volume changing unit 120 maintains its original state or may be deformed to a much smaller width than the opposite side thereto.

As such, if the upper and lower ends of the first to sixth plates 121, 122, 123, 124, 125, and 126 may ascend and descend, respectively, compared to the controllers 100 and 100*a* according to the first and second embodiments, there is an advantage of implementing a much more diverse and unique shape.

Meanwhile, the method of changing the shape of the controller by controlling the driving units 150 and 160 in the controllers 100, 100*a*, and 100*b* according to the embodiments of the present invention may be implemented in the form of a program command and recorded in a computer readable recording medium that may be executed by various computer means.

However, the operation control of the driving units 150 and 160 does not necessarily need to be implemented in software, and all or some of functions may be implemented in hardware, or a combination of software and hardware. In this case, the hardware may be an application specific integrated circuit (ASIC).

Hereinabove, the preferred embodiments of the present invention have been described, but the present invention is not limited to the aforementioned embodiments and can be modified or changed in various forms in a specific application process.

As an example, in the above-described embodiments and drawings, six plates are symmetrically arranged along the circumference of the housing 110, but the present invention is not limited thereto. For example, like the controller 100*c* illustrated in the plan view of FIG. 23, the three plates 121, 122, and 123 may be asymmetrically installed only on a part of the outside of the housing 110.

As another example, accessories having various shapes may be mounted on the end of the housing 110. The accessories may be provided in various types to match various contents executed on electronic devices. For example, if various types of accessories having a shape such as a golf club head, a table tennis/tennis racket, and weapons (firearms, swords, bows, etc.) are provided together, while the accessories matched with the contents are mounted on the end of the housing 110, the shape of the controller 100 is appropriately adjusted to allow a user to feel a more vivid feeling of use and fun.

As yet another example, a vibration actuator for haptic feedback may be additionally installed in the housing 110.

As yet another example, it has been described above that the embodiment of the present invention is applied to a controller such as a game console or a VR device, but a field of application of the controllers 100, 100a, and 100b according to the embodiments of the present invention is not limited thereto. For example, the present invention may be installed on the insole of a shoe or under the insole to be used for supporting an arch portion of the user's sole, or installed on the back of a chair to be used for supporting the user's waist, and may be used in various other fields.

As described above, the present invention may be modified or changed in various forms in the specific applying process, and modified or changed embodiments include the scope of the present invention without departing from the technical spirit of the present invention disclosed in the appended claims.

| Explanation of reference numerals | |
|---|---|
| 100: Controller | 110: Housing |
| 112: Slit | 120: Volume changing unit |
| 121, 122, 123: First, second, third plates | |
| 124, 125, 126: Fourth, fifth, sixth plates | |
| 121a, 124a: Upper end | 121b, 124b: Lower end |
| 130: MCU | 132: Processor |
| 134: Memory | 140: Handle unit |
| 150: First driving unit | 160: Second driving unit |
| 151, 161: Ball screw | 152, 162: Nut block |
| 153, 163: Moving guide | 154, 164: Moving block |
| 155: Wire | 156, 157: Pulley |
| 158: Power transmission unit | 170: Input unit |
| 180: Motion sensor | 190: Power supply unit |
| 200: Communication unit | 210: Pressure sensor |

What is claimed is:

1. A controller capable of changing volume comprising:
a housing:
a first moving block and a second moving block installed inside the housing;
a volume changing unit comprising at least one flexible plate, wherein at least a part of the flexible plate is exposed to outside of the housing, and an upper end of the flexible plate is coupled to the first moving block and a lower end of the flexible plate is coupled to the second moving block;
a driving unit for moving the first moving block and the second moving block linearly; and
a processor configured to control the driving unit.

2. The controller capable of changing volume of claim 1, wherein the volume changing unit comprises a plurality of flexible plates symmetrically arranged along a circumference of the housing.

3. The controller capable of changing volume of claim 1, wherein the driving unit comprises a first driving unit and a second driving unit, and wherein the first moving block is linearly moved by the first driving unit and the second moving block is linearly moved by the second driving unit.

4. The controller capable of changing volume of claim 1, wherein the volume changing unit comprises a plurality of flexible plates, the driving unit comprises a plurality of upper driving units connected to upper ends of the plurality of flexible plates, respectively, and a plurality of lower driving units connected to lower ends of the plurality of flexible plates, respectively, and the processor is further configured to individually control shapes and positions of the plurality of flexible plates by independently controlling the plurality of upper driving units and the plurality of lower driving units.

5. The controller capable of changing volume of claim 1, further comprising:

a motion sensor that detects movement of the controller, wherein the processor is further configured to control the driving unit to operate the volume changing unit only when a detection value of the motion sensor satisfies a predetermined condition.

6. The controller capable of changing volume of claim 5, further comprising:

a pressure sensor installed on the housing,
wherein the processor is further configured to switch a mode of the controller from a standby mode to a motion monitoring mode when a detection value of the pressure sensor is greater than a predetermined value, and determine whether the detection value of the motion sensor satisfies the predetermined condition only after switching the mode to the motion monitoring mode.

7. The controller capable of changing volume of claim 1, further comprising:

a pressure sensor installed on the housing,
wherein the processor is further configured to control the driving unit to operate the volume changing unit only when a detection value of the pressure sensor satisfies a predetermined condition.

8. The controller capable of changing volume of claim 7, wherein the processor is further configured to adjust a gap between the first moving block and the second moving block, to a first distance when the detection value of the pressure sensor is within a predetermined value, and adjust the gap between the first moving block and the second moving block to a second distance different from the first distance when the detection value is greater than the predetermined value.

* * * * *